United States Patent [19]
Hultman

[11] Patent Number: 5,580,204
[45] Date of Patent: Dec. 3, 1996

[54] PANEL ATTACHMENT SYSTEM

[75] Inventor: Bryan E. Hultman, Rockford, Ill.

[73] Assignee: Textron Inc., Providence, R.I.

[21] Appl. No.: 399,568

[22] Filed: Mar. 7, 1995

[51] Int. Cl.$^6$ .............................. F16B 19/00; F16B 21/00
[52] U.S. Cl. .................... 411/509; 411/339; 411/913; 24/297; 403/407.1
[58] Field of Search .................................. 411/338, 339, 411/508, 509, 510, 913; 24/297, 453; 403/407.1

[56] References Cited

U.S. PATENT DOCUMENTS

| | | | |
|---|---|---|---|
| 4,176,428 | 12/1979 | Kimura | 24/297 X |
| 4,716,633 | 1/1988 | Rizo | 24/297 X |
| 4,861,208 | 8/1989 | Boundy | 411/339 |
| 5,111,557 | 5/1992 | Baum et al. | 24/297 X |
| 5,217,337 | 6/1993 | Junemann et al. | 24/297 X |
| 5,339,491 | 8/1994 | Sims | 411/339 X |

OTHER PUBLICATIONS

Chilton's Cadillac Deville/Fleetwood/Eldorado/Seville 1990–1993 Repair Manual, copyright 1994, Chilton Book Company.

1987 General Motors Body Service Manual, copyright 1986, General Motors Corporation.

General Motors Auto Repair Manual Lumina, APV, Silhoutte, Trans Sport 1990–92, copyright 1992, Hayes North America Inc.

Primary Examiner—Neill R. Wilson
Attorney, Agent, or Firm—Trexler, Bushnell, Giangiorgi & Blackstone, Ltd.

[57] ABSTRACT

A fastener assembly and method for attaching a first member to a second member. The fastener assembly includes a socket member which defines a socket and a stud which includes a head engagable with the socket of the nut. The stud is attached to a first member and the nut is attached to a second member. The assembly is initially attached to the first member by attaching the stud to the first member and then inserting the nut into the second member. When the first member must be removed from the second member, the head of the stud is forcibly disengaged from the socket of the nut. Reattachment of the first member the second member is achieved by forcibly engaging the head with the socket. After the initial insertion, the socket member remains captively retained on the second member.

20 Claims, 1 Drawing Sheet

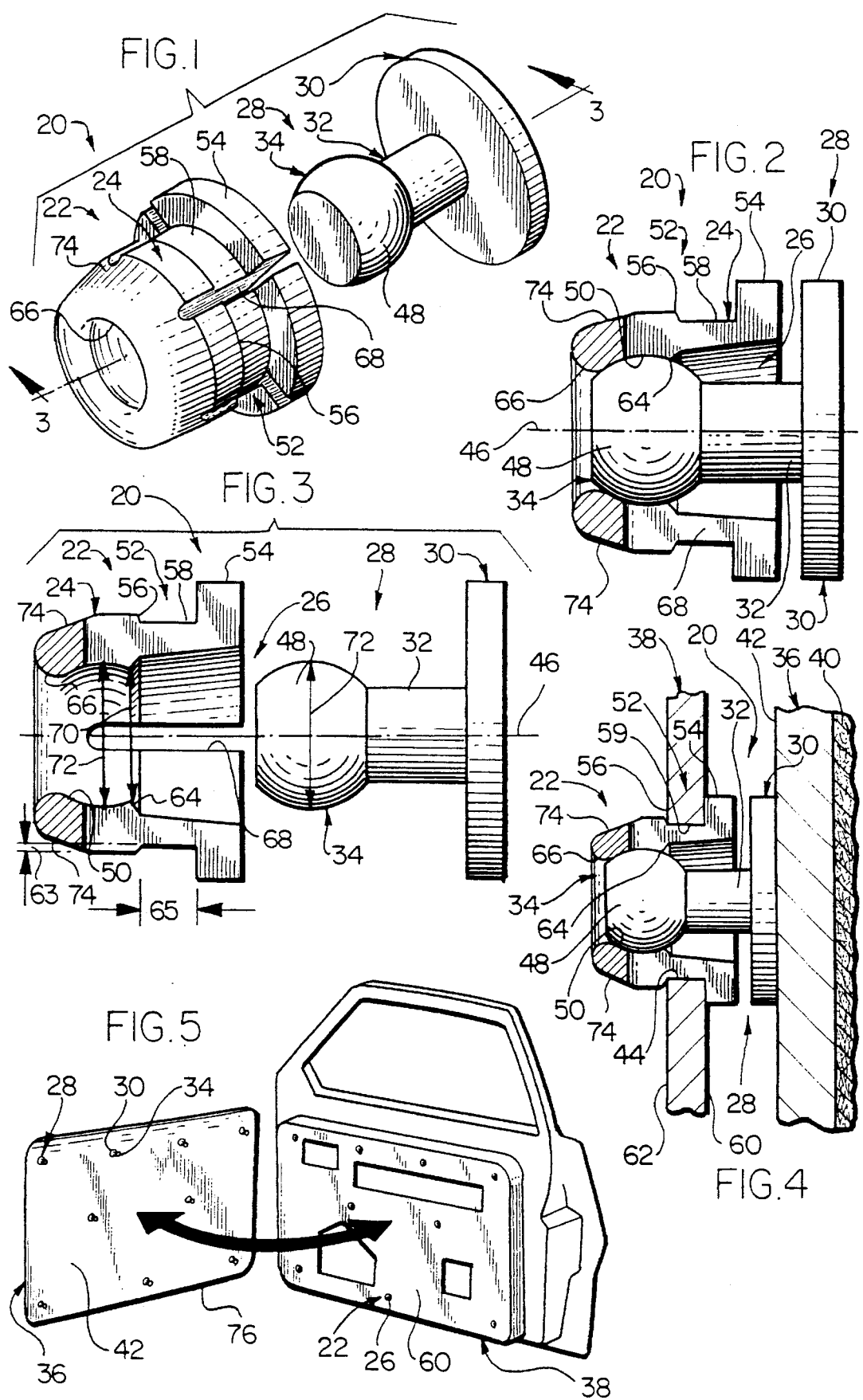

PANEL ATTACHMENT SYSTEM

BACKGROUND

The present invention relates to a two part fastener assembly which includes a stud which is engageable with a socket member. More specifically, the present invention relates to a fastener assembly having a stud and a socket member which are attached to a first and second member, respectively, for providing releasable attachment of the first member relative to the second member.

The background of the present invention will be explained by reference to a door panel for an automobile which is attachable to and removable from a door frame structure. The door panel typically is an interior cosmetic panel which is provided with a suitable surface such as fabric, other material, or a desired formed surface. The background and further description of the present invention will be presented by way of this example, but it should be understood, that the present invention is not limited to automotive door panels. To the contrary, there are undoubtedly numerous other applications, both within the automotive industry and without, which would greatly benefit from the use of the fastener assembly of the present invention and the method of attaching a first member to a second frame member.

Returning to the example of the door panel and door structure, there have been numerous prior art devices which have been employed to attach an interior door panel to the door structure of an automobile. Interior door panels are often attached by means of screws, push-in fasteners, or hook type devices. Each of these devices is limited in its application for use in attaching a door panel to a door structure in that each device presents limitations or deficiencies which require improvement.

For example, while screws have been a prevalent fastening device for attaching a first member to a second member, when used in attaching a door panel to a door structure, the screws require substantial assembly time for positioning, driving, and covering the screwhead. When using screws to attach a door panel, the panel must be positioned, the screw must be positioned in a corresponding hole through the door panel, and then the screw must be driven into the corresponding area or hole in the underlying door structure. A problem arises in the time needed to properly drive a sufficient number of screws to securely hold a door panel to the door structure. Further, if the operator slips while driving the screw, the cosmetic surface of the door panel may become damaged thereby increasing assembly time, increasing costs, and introducing quality problems. Once a panel is attached using screws the screw heads must be capped or covered in order to provide a finished appearance. Often the caps or structure used to cover the screw head is exposed and unsightly. Alternatively, the fabric or other material surfacing the interior door panel maybe slit so as to cover over the screw head once the panel is attached. Such a slit in the material on the interior surface of the door panel, however, may not produce a desired high quality finished appearance.

In an attempt to improve upon the shortcomings of screws, a number of fasteners and hook type devices have been produced. Push-in fasteners have helped reduce the time required to drive screw-type fasteners and may have also helped reduce the possibility of damage to the interior surface of the door panel since rotary drivers are not employed to drive the push-in fasteners. Push-in fasteners are easier to use, and typically cost less than a threaded screw-type fastener. These push-in fasteners, however, may still have to be driven or forced through a hole formed through the interior surface of the door panel. This operation requires a cap to be applied over the fastener after driving or forming a slit in the material on the interior surface of the door panel so that the head of the push-in fastener is covered after the panel is attached.

Push-in fasteners also present reliability and reuse problems. For example, when the head of a push-in fastener is attached to the door structure, the fastener may become damaged upon removal of the panel from the door structure requiring a new fastener to be attached to the door panel. Further, these push-in type fasteners may be damaged upon the initial insertion thereby presenting reliability issues.

Other hook type devices presents similar problems as the push-in fasteners such as complications upon initial insertion, positioning, and reuse. When metallic hooks or fasteners are used, they are subject to bending or deformation requiring additional time during initial assembly and when reattaching the panel after removal.

It is also important to improve upon the uniformity of the fasteners used to attach door panels to door structures. As described hereinabove, it may be evident that a wide variety of fasteners such as screws, push-in fasteners and hooks are available to attach door panels to door structures. In this regard, it would be beneficial to both the initial assembler and the person who later services the vehicle to present a well known standard fastener. In this regard, a standard fastener could be used for all door panels reducing inventories of specialized parts thereby reducing costs for tracking, producing, training.

A further problem with existing fasteners is that they often blemish the surface of the interior of the door panel. For example, some fasteners may have a point attachment to the reverse side of the door panel. This point attachment may result in a blemish on the cosmetic side of the door panel, such as a bump or rise in the cosmetic side, once application forces are applied to the door panel. Available attachment hooks may provide similar results due to the generally point contact construction of such attachment hooks.

Prior to the present invention, Applicant is unaware of any fastening system or method which resolves and overcomes the aforementioned problems. As such, it would be desirable to provide a fastener system and method for attaching a door panel to a door structure which overcomes the aforementioned problems.

OBJECTS AND SUMMARY

A general object which may be satisfied by the invention is to provide a fastener assembly which improves the ease of installation of the assembly of a first member to a second member.

Another object which may be satisfied by the invention is to provide a fastener assembly and method of fastening a first member to a second member which improves the reliability of the initial fastener connection upon installation.

Yet another object which may be satisfied by the invention is to provide a fastener assembly and method of fastening a first member to a second member which improves the reliability of the fastener connection upon repeated removals and reattachments of the first member relative to the second member.

Still a further object which may be satisfied by the invention is to provide a fastener assembly and a method of attaching the fastener assembly which securely holds a first member relative to a second member and prevents the formation of undesirable blemishes on a cosmetic side of the first member.

Briefly, and in accordance with the foregoing, the present invention envisions a fastener assembly and method for attaching a first member such as a door panel to a second member for example a door frame. The fastener assembly includes a socket member which defines an internal socket, and a stud which includes a head engageable within the socket. The stud is attached to, mounted upon or formed integral with a first member, such as an automotive door or trim panel and the socket member is mounted to the stud, either before or after the stud is affixed to the first or panel member. The stud and socket assembly is initially attached to the first member by attaching the stud to the first member, and thereafter engages the socket member into an aperture provided in the second member. When the first member must be removed from the second member, the head of the stud is forcibly disengaged from the socket member, which remains attached to the second member, i.e., the door frame. Reattachment of the first member to the second member is achieved by forcibly re-engaging the stud with the socket. Thus, the first member such as a door panel may be easily removed for service, and then remounted with considerable ease. It can thus be appreciated that the invention provides an attachment system and method which permits ease in assembly and disassembly for service, yet provides an aesthetically appealing surface, free of any caps or projections.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which:

FIG. 1 is an exploded perspective view of a fastener assembly of the invention showing a stud having a partially arcuate head and a socket member defining an internal socket for receiving the head of the stud therein;

FIG. 2 is a partial cross sectional view of the fastener assembly of the invention in which the stud is engaged in the socket and in which only the socket member is presented in cross section;

FIG. 3 is a partial cross sectional view similar to that as shown in FIG. 2 in which the head of the stud is disengaged from the socket of the socket member;

FIG. 4 is a partial cross sectional view showing the fastener assembly of the invention in combination with a first and second member and in which the stud is attached to the first member and the socket member is engaged within an aperture provided in a second member with the head of the stud disposed in the socket of the socket member; and FIG. 5 is an exploded perspective of a door panel and a door frame structure in which the fastener assembly of the invention is employed, the door panel having been removed from the door frame and ready for reassembly.

DESCRIPTION

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

With reference to FIGS. 1–4, an enlarged view of a fastener assembly 20 is shown. The fastener assembly 20 includes a socket member 22 having a body portion providing a socket housing and walls 24 and defining an internal socket 26 therein. The fastener assembly 20 also includes a stud 28 having a base 30 with a neck 32 extending therefrom and an enlarged or bulbous head 34 disposed on the neck 32 spaced away from the base 30. The head 34 of the stud 28 is engagable within the socket 26 of the member 22, as generally shown in FIGS. 2 and 4.

The fastener assembly 20 may be used to attached a first member 36 such as a door or trim panel to a second member 38 as for example an automotive door frame (shown generally in FIG. 4 and more specifically in FIG. 5). With reference to FIG. 5, the first member 36 is represented as an interior door panel while the second member 38 is represented as a door frame structure. Of course other automotive frame structures could be involved. The door panel 36 has a cosmetic or finished side 40 which is exposed to the interior cabin of the vehicle and a reverse side 42 which faces the corresponding door frame structure 38. As shown in FIG. 4, the fastener assembly 20, and more specifically the base 30 of the stud 28, is attached to the reverse side 42 of the first or panel member 36 with the socket member 22 being inserted and secured within an aperture 44 formed in the second or frame member 38.

Briefly, in practice for example the socket member 22 can be pre-assembled to the stud 28 in essentially the condition as shown in FIG. 2. The stud 28, with the socket member 22 thereon, is then assembled or affixed to the unfinished or reverse side of a first or panel member 36. This can be done by gluing, ultrasonic welding or any other method. Or as an alternative, the stud 28 could be formed integral with the panel member 36. The second member or door frame 38 includes a plurality of apertures conforming to the location of the fastener assemblies 20 on the first panel member 36. Accordingly, the first or panel member 36 is assembled to the frame 38 by disposing the socket member 22 into the associated apertures in the frame 38. The socket member 22 will deform or flex sufficiently to permit assembly, or disposition within the frame apertures. Once the stud 28 and socket 26 are assembled, they are keyed or locked to the second or frame member 38, as will be discussed. That is to say once the socket member 22 are engaged in the frame apertures, they cannot be removed without use of excessive force. On the other hand should it become necessary to remove the panel or first member 36, a service technician need merely pull on the panel 36 to disengage the head 34 of the stud from the internal socket 26. The panel 36 can thus be removed for service and then re-installed or positioned in place by merely re-engaging the head 34 of the studs within the socket member 22, which remained mounted to or affixed within the frame apertures.

Having now briefly described the overall structure and function of the invention, we shall describe the details of the fastener assembly 20 and the method for attaching the first or panel member 36 to the second or frame member 38. Further, while the description herein is presented with regard to a door panel 36 which is attached to a door frame structure 38 of an automobile, it should be understood that the present invention may be used in other areas where one member is attached to a second member and it may be desirable to provide a faster assembly which securely retains the first member to the second member yet allows easy and reliable removable and reattachment. Such other uses may include the attachment of instrument panels to dash boards as well as other specific uses not particularly described herein yet clearly within the spirit and scope of the invention.

As shown in FIGS. 1–4, the stud 28 includes a generally circular base extending radially relative to the neck 32. It should be noted that the stud may be formed of a plastic material, metal or composite. The neck 32 defines a central longitudinal axis 46 extending therethrough. The stud 28 is generally coaxially engaged with the socket member 22 along the central axis 46. However, generally convex, partially arcuate surface 48 of the head 34 and the corresponding generally concave, partially arcuate mating surface 50 in the socket 26 allows some degree of rotational or pivotal movement relative to the central axis 46. This facilitates alignment both upon initial assembly and reattachment.

The structure for retaining the socket member 22 in assembly with the frame member 38 is referred to as the retaining structure and is designated generally 52. The retaining structure 52 is provided on the exterior surface of the socket member 22. The retaining structure 52 includes a flange 54 and an annular lip 56 spaced away from the flange 54. An annular groove 58 is defined between and by the flange 54 and the lip 56. The reduced diameter annular groove 58 captures an inside edge 59 of the aperture 44 in the second or frame member 38.

When inserting the socket member 22 into the aperture 44, the flange 54 abuts surface 60 of the second member 38 thereby limiting the extent to which the member 22 is inserted through the aperture 44. The annular lip 56 is forced through the aperture 44 to engage the opposite side 62 of the second member 38 to resist removal of the socket member 22 from the second or frame member 38. As such, the edge of the aperture 44 is retained in the annular groove 58, and the socket member 22 is securely and fixedly mounted to the frame member 38.

With reference to FIG. 3, the extension (as indicated by dimension 63) of the lip 56 and the width (as indicated by dimension 65) are selected to permit engagement of the member 22 in the aperture 44 yet prevent disengagement after initial insertion. The dimensions 63, 65 must be selected to provide resistance to the forces which are applied to the panel in order to disengage the head 34 of the stud from the socket 36.

The base 30 of the stud 28 is attached to the reverse side 42 of the first or panel member 36 by any one of a number of methods. For example, the base 30 may be attached to the reverse side 42 using adhesive, ultrasonic welding, or thermal joining such as directly applied heat or mechanically induced heat by such methods as spin welding. The stud 28 may also be attached by directly forming the stud into or as an integral feature of the first member 36. Choice of attachment method used will generally depend upon the material properties of the stud and any other factors such as the number of fastener assemblies and the costs associated with each joining method. Also, the base 30 may not be required or may be eliminated if the stud 28 is integrally formed with the panel or insert molded in the panel.

Generally, a preferred assembly or attachment configuration and process for the fastener assembly 20 is to engage the head 34 of the stud 28 in the socket 26 of the socket member 22 and thereafter attach the stud 28 to the reverse side 42 of the first member 36. Next, the panel member 36 with the assemblies 20 thereon is positioned relative to a frame structure 38 to which it is to be attached, said frame having apertures 44 formed therein, with the position of the assemblies 20 on panel member 36 conforming to the apertures 44 in said frame member 38. The retaining structure 52 of the socket member 22 of assemblies 20 are then engaged with the corresponding apertures 44 in the second member 38.

In order for the present fastener assembly 20 to provide its desired function, it must provide secure yet releasable engagement between the head 34 and the socket 26 while providing a degree of deformation of the socket member 22 to facilitate engagement of the retaining structure 52 with the aperture 44. To retain the fastener 28 and socket member 22 in engagement, an annular rim 64 is provided on the inside surface of the socket 26. The mating surface 50 extends from the annular rim 64 towards a mouth 66 formed in the body 24 distal the flange 54.

Circumferentially spaced slots 68 are provided in the body 24 extending generally from a position on the outside of the socket member 22 spaced away from the lip 56 and extending through the flange 54. These slots 68 are spaced apart around the body 24 to accommodate expansion and contraction of the member 22 as required during assembly to the panel 38 and upon disposition of the stud head 34 within the internal socket 26. The member 22 is compressed when the member 22 is initially engaged in the aperture 44, and expanded when the head 34 is engaged in or disengaged from the socket 26. The slots 68 extend axially from the end face of flange 54 into the area of the concaved, arcuate surface 50 of said internal socket 26. This permits the portion of the socket member 22 in the area of the concave surface 50 which engages the head 34 of the stud to flex to permit engagement, detachment and re-engagement of the head 34 in said socket 26 and more specifically with said concaved arcuate portion 50.

As shown in FIG. 3, an inside diameter 70 of the rim 64 is smaller than a diameter 72 of the arcuate mating surface 50 and a diameter 72 of the corresponding outside arcuate of the head 34. The diameter 72 of the arcuate surface of the head 34 is generally equal to the diameter 72 of the interior mating surface 50 and thus is represented by a single diameter 72. When the head 34 is initially engaged in the socket 26 the larger diameter 72 forces the smaller diameter 70 portion of the socket member 22 apart. The member 22 can be deformed while attaching the head 34 since the slots 68 allow for a degree of expansion.

In a similar manner, when the socket member 22 is inserted into the aperture 44 a sloped leading end or surface 74 is initially presented to the aperture 44 and urged therethrough. Portions of the socket member 22 tend to deflect or deform inwardly initially relative to the central axis 46, but as the lip 56 passes through the aperture 44, the socket member 22 will expand to grip the walls of aperture 44. A certain degree of material deformation may occur near the lip 56 in order to squeeze the member 22 through the aperture 44. Additionally, the open mouth 66 in combination with the expansion slots 58 allow for a degree of movement of portions of the socket member 22 degree of movement of portions of the socket member 22 relative to the axis 46. Once the socket member 22 of fastener assembly 20 is engaged with the aperture 44 the slots 52 further provide for a degree of deformation of the socket member 22 material when the stud 28 is removed from the socket 26. Also, please note that the retaining structure 52 has been designed so that once the socket 22 is assembled with aperture it cannot be removed easily, and that the head 34 of the stud 28 will separate from the socket 26, before the socket member 22 can be forced out of the aperture 44.

Additionally, the invention set forth herein provides for the fastener assembler 20 being attached to or integrally formed with the first member 36. In this regard, the first or panel member 36 and the fastener assembly 20 may comprise a single structure. Advantageously, the fastener assembly 20 may be configured, sized and dimensioned to be used to retrofit existing fasteners. In this use, the existing fastener would need to be removed from the panel and the aperture 44 in the second member 38 would either be provided by virtue of being formed for use with the prior art fastener or would need to be formed in the second or frame member 38. The fastener assembly 20 could then be attached according to the teaching described herein to provide reliable reusable attachment.

In use, the fastener assembly 20 is used to attach the first or panel member 36 to the second or frame member 38. The stud 28 is attached to the first member 36 with the socket member 22 retained on the head 34. The present fastener assembly 20 is highly advantageous in that only one step is required to completely attach the panel 36 to the door structure 38.

For example, in an automotive assembly application, the fastener assembly 20 may be quickly and easily attached to the reverse side 42 of the door panel 36 manually, by use of automation, or integrally formed on the reverse side 42 of the first member 36. The studs 28 may even be formed on a strip or attached to a strip to further facilitate proper alignment of the studs.

With apertures 44 formed in the second or frame member 38 in a corresponding pattern or locations, the panel is merely placed to align the socket member 22 with the corresponding apertures 44. This step may even be automated further improving the ease and efficiency of the assembly process. A force is applied to the panel to force or snap fit the socket member 22 through the aperture 44 thereby securely retaining the panel 36 on the structure 38. In order to remove the panel, a force is applied, for instance along an edge 76 of the panel to pry or otherwise disengage the head 34 of the studs 28 from the socket 26, the socket member 22 remaining in place in apertures 44. Reattachment is effected in a similar manner, re-engaging the studs 28 with the socket member 22. The materials used for the socket member and stud are such that a desired degree of flexibility is provided as well as wearability such that the rim 64 will not wear down after a reasonable number of disengagements and reattachments.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A fastener assembly in combination with a first panel member for securing said first panel member to a second member, such as a frame, said first member having a cosmetic side and a reverse surface, said fastener assembly in combination with said first member comprising a stud attached to said reverse surface of said first member, including a head spaced away from said reverse surface; a socket member defining a socket having an internal surface which is configured for receiving said head of said stud and releasably retaining said head therein, said socket member having an external configuration for attachment to said second member upon application of a force to said cosmetic side of said first member, wherein said first member to which said stud is attached may be repeatedly removed from and replaced on said second member to which said socket member is attached by applying a force to said first member generally opposite said second member for disengaging said head of said stud from said socket without detaching said socket from said second member and applying a force generally towards said second member for reinserting said head into said socket.

2. A fastener assembly in combination with a first member for securing said first member to a second member as recited in claim 1, further comprising adhesive applied to at least one of said stud and said first member for attaching said stud to said first member.

3. A fastener assembly in combination with a first member for securing said first member to a second member as recited in claim 1, further comprising attaching said stud to said first member by ultrasonic welding.

4. A fastener assembly in combination with a first member for securing said first member to a second member as recited in claim 1, further comprising attaching said stud to said first member by thermal joining.

5. A fastener assembly in combination with a first member for securing said first member to a second member as recited in claim 1, further comprising said stud being integrally formed on said first member.

6. A fastener assembly according to claim 1, wherein said socket structure has an external configuration including a groove for receiving the internal edges of an aperture in said second member.

7. A fastener assembly according to claim 6, wherein said socket member including a plurality of circumferentially spaced slots extending through said groove to permit said socket to be disposed in an aperture.

8. A fastener assembly according to claim 1, wherein said stud comprises a base portion for mounting to said first member, and an enlarged, generally spherical head portion for complimentary disposition in said socket.

9. A fastener assembly according to claim 1, wherein said stud has a head portion with a generally convex, spherical surface, and said socket includes complimentary, spherically concaved surface portion for received said head portion of said stud.

10. A fastener assembly for use in securing a first member, such as a decorative panel, to a second member, such as an underlying support frame, said fastener assembly comprising:

a stud member and a socket member;

said stud member including a base portion, a neck portion extending from said base portion and a bulbous head portion;

said socket member defining an internal socket configuration for receiving said stud, said socket member having an internally concave portion for receiving said bulbous portion of said stud member, and an externally flanged portion for engaging an aperture in said second member, said externally flanged portion overlying said neck portion, said neck portion being of a reduced diameter with respect to a maximum diameter of said bulbous portion, whereby said socket member may be preassembled on said stud member with said bulbous portion of said stud member disposed in said concave portion of said socket member, and said preassembled socket member and stud member engaged in an aperture in said second member with said flange portion of said socket member being free to flex upon insertion of said socket member into an aperture formed in said second member, said flexure permitting ease of assembly and accommodating tolerance variations with respect to the position of said aperture in said second member.

11. A fastener assembly as recited in claim 10, wherein said flanged portion of said socket member includes at least one axially extending slot for increasing the flexibility of said flange portion.

12. A fastener assembly as recited in claim 11, wherein each of said at least one slot extends through said socket member beyond a mid-point of said internal socket configuration for increasing the flexibility of said flanged portion when inserting said socket member into an aperture in said second member and for increasing the flexibility of the socket member when removing and inserting said bulbous portion of said stud member from and into said internal socket configuration.

13. A fastener assembly as recited in claim 10, wherein said bulbous head defines a convex partially arcuate surface and said internal socket configuration defines a concave partially arcuate surface generally corresponding to said convex partially arcuate surface of said bulbous portion.

14. A fastener assembly as recited in claim 10, said socket member further comprising a socket housing having walls defining said internal socket configuration therein; said flanged portion extending from said walls of said socket housing; a generally continuous lip formed on an exterior surface of said socket housing axially spaced from said flanged portion; said flanged portion and said lip defining an annular groove therebetween for receiving a portion of an aperture in said second member therein to retain said socket member relative to said second member; at least one axially extending slot in said wall of said socket housing extending from said flanged portion axially toward said internal socket configuration, whereby said at least one axially extending slot increases the flexibility of the flanged portion and said walls for promoting the flexibility of said socket member to facilitate insertion of said socket member into said aperture formed in said second member and for promoting deformation of said socket member when removing and inserting said bulbous head from and into said internal socket configuration.

15. A fastener assembly as recited in claim 12, wherein said concave arcuate surface in said socket is a generally continuous surface for contacting corresponding areas on said convex partially arcuate surface on said bulbous head.

16. A method for attaching two members employing a fastener assembly including the steps of:
providing a stud and a socket member, said socket member defining a socket having an internal surface which is configured for receiving said stud and releasably retaining said stud therein;
engaging a portion of said socket member with at least a portion of said stud;
providing said stud as a separate component and affixing said stud to said first member;
positioning said first member with said socket member and stud members disposed for engagement with a corresponding aperture formed in said second member;
forcing said socket into said aperture in said second member to mount said first member to said second member;
wherein said first member with which said stud is attached being repeatedly removable from and replaceable on said second member to which said socket member is attached by applying a force to said first member generally opposite said second member for disengaging said head of said stud from said socket without disengaging said socket member from the aperture in said second member, and applying a force generally towards said second member for reinserting said stud into said socket to reattach said first member relative to said second member.

17. A method as recited in claim 16, further comprising the steps of attaching said stud to said first member using adhesive applied to at least one of said stud and said first member.

18. A method as recited in claim 16, further comprising the step of attaching said stud to said first member by ultrasonic welding.

19. A method as recited in claim 16, further comprising the step of attaching said stud to said first member by thermal joining.

20. A method as recited in claim 16, further comprising the step of integrally forming said stud on said first member.

* * * * *

UNITED STATES PATENT AND TRADEMARK OFFICE
CERTIFICATE OF CORRECTION

PATENT NO. : 5,580,204
DATED : December 3, 1996
INVENTOR(S) : Bryan E. Hultman

It is certified that error appears in the above-indentified patent and that said Letters Patent is hereby corrected as shown below:

Column 6, Lines 55-56 delete "degree of movement of portions of the socket member 22 relative".

Signed and Sealed this

Seventeenth Day of June, 1997

Attest:

BRUCE LEHMAN

*Attesting Officer*  *Commissioner of Patents and Trademarks*